J. B. SCHOFIELD.
SPECTACLES AND EYEGLASSES.
APPLICATION FILED AUG. 18, 1909.
964,188.
Patented July 12, 1910.
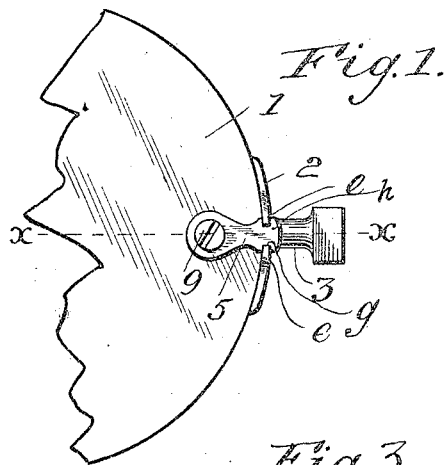
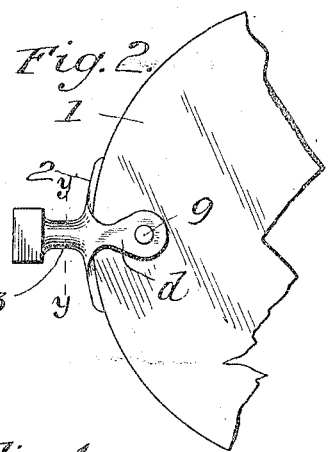
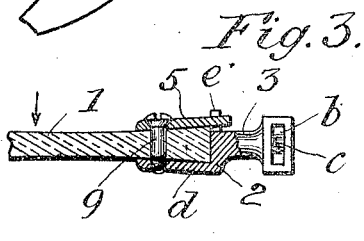
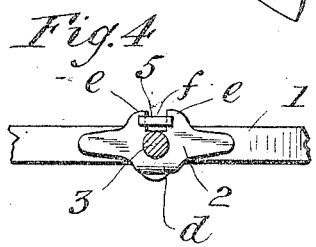
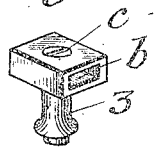
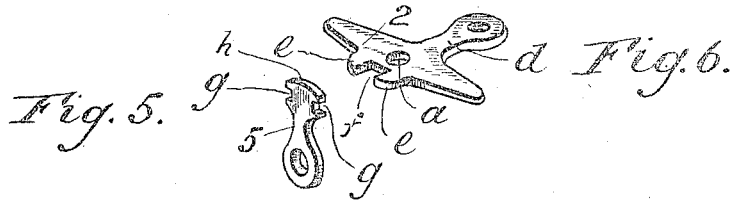
WITNESSES:
INVENTOR
Joseph B. Schofield
BY
Attorneys.

UNITED STATES PATENT OFFICE.

JOSEPH B. SCHOFIELD, OF BALTIMORE, MARYLAND.

SPECTACLES AND EYEGLASSES.

964,188.

Specification of Letters Patent. Patented July 12, 1910.

Application filed August 18, 1909. Serial No. 513,380.

*To all whom it may concern:*

Be it known that I, JOSEPH B. SCHOFIELD, of the city of Baltimore and State of Maryland, have invented certain Improvements in Spectacles and Eyeglasses, of which the following is a specification.

This invention relates to an improved clamp for attaching to a lens devoid of a rim, a temple such as is used in spectacles or the bridge of eyeglasses; and its object is to so construct the clamp that it may be easily applied to the lens and will adjust itself to the surfaces of the same, as will hereinafter fully appear.

In the further description of the said invention which follows, reference is made to the accompanying drawing forming a part hereof and in which—

Figure 1 is a face view of a part of a lens to which is applied the improved clamp adapted at its outer end to receive the bridge not shown. Fig. 2 is a reverse view of Fig. 1. Fig. 3 is a section of Fig. 1 taken on the dotted line $x$—$x$. Fig. 4 is a section of Fig. 2 taken on the dotted line $y$—$y$. Figs. 5, 6 and 7 are perspective views of the members of the clamp, the last two illustrating a slight modification in construction.

Referring now to the drawing, 1 is a part of a lens of rimless eyeglasses, and 2 a plate which in Fig. 6 is shown as having a hole $a$ to receive the end of the stud 3 which is provided with a socket $b$ into which is inserted one end of the bridge not shown. The bridge is held in place in the socket by means of the screw $c$ shown only in Figs. 3 and 7.

The plate 2 which is originally made flat as shown in Fig. 6 is subsequently bent longitudinally into a curve to fit closely against the edge of the lens as shown in Figs. 1 and 2. At one side the plate 2 has an extension $d$ which is bent down at a right angle as shown in Figs. 2, 3 and 4 to form the fixed member of the clamp in which the lens is held. At the other side of the plate 2 are formed the projections $e$ which are separated by the rectangular space $f$.

5 is a plate having a conformation corresponding very nearly with the extension $d$, and which when in position as hereinafter described, forms the other and separable member of the clamp; and its head is provided with the notches $g$ so as to engage the projections $e$. By notching the plate 5, it will be seen that its end is provided with the head $h$ the edges of which overlap the projections $e$ and thereby serve to prevent the bending of the plate $d$, and reduce the danger of breaking the lens should pressure be exerted thereon in the direction indicated by the arrow in Fig. 3. It will therefore be understood that the head $h$ formed by notching the plate 5 as described, performs an important function and is necessary to the proper carrying out of my invention.

By means of the construction shown, the plate 5 can be moved a limited distance toward and from the stud 3, and will adjust itself to the surface of the lens without being detached from the plate 2, or altered in length. Upon setting up the screw 9 which passes through the lens the two sections or members of the clamp are drawn together and in close contact with the lens.

It will be understood that in applying the clamp to a lens, it is only necessary to bend the clamp member $d$ to make it conform to the surface of the lens, as the other member (plate 5) being loose, adjusts itself to the lens as before stated.

I claim as my invention—

A clamp for the lens of rimless spectacles and eyeglasses, which consists of a curved plate which fits the edge of the lens and has at one side thereof a fixed clamping member, and at the other side two projections which produce a space or notch between them, combined with a separable member which is notched so as to form an exterior head which bears against the outer face of the said projections and admits of the engagement of the two members of the clamp in the manner described, and a screw which passes through the two members of the clamp and the lens, substantially as specified.

JOSEPH B. SCHOFIELD.

Witnesses:
 W<span>M</span>. T. HOWARD,
 WILLIE D. SCHOFIELD.